United States Patent [19]

Bahrton

[11] 4,409,851
[45] Oct. 18, 1983

[54] OSCILLATING VANE FLOWMETER

[76] Inventor: Per S. Bahrton, Stamstigen 13, S-181 47 Lidingö, Sweden

[21] Appl. No.: 313,083

[22] Filed: Oct. 20, 1981

[30] Foreign Application Priority Data

Oct. 24, 1980 [SE] Sweden .............................. 8007504

[51] Int. Cl.³ .......................... G01F 1/20; G01F 1/66
[52] U.S. Cl. ................................................. 73/861.21
[58] Field of Search .......... 73/861.21, 861.24, 861.18, 73/861.22, 861.37, 861.38

[56] References Cited

U.S. PATENT DOCUMENTS 3,796,096 3/1974 Sielaff et al. .................... 73/861.24
4,092,859 6/1978 DeCarlo ........................... 73/861.21
4,343,192 8/1982 Shimomura ..................... 73/861.21

FOREIGN PATENT DOCUMENTS 807095 12/1974 U.S.S.R. .......................... 73/861.21

Primary Examiner—Herbert Goldstein
Assistant Examiner—David R. Schuster
Attorney, Agent, or Firm—Sughrue, Mion, Zinn, Macpeak and Seas

[57] ABSTRACT

The invention relates to flowmeters and solves the problem of providing a simple and reliable meter that has a wide measuring range and high measuring accuracy over the entire range, including its lower part in the region around values for Reynolds Number of about 200. According to the invention, there is a T-shaped oscillating element (8) inside the meter between a pair of projections (6, 7), which throttle the flow, causing separation and turbulence. The oscillating element is actuated upon not only by negative pressure forces, but also by forces of positive pressure, which provides steady operating conditions. (FIG. 4)

9 Claims, 6 Drawing Figures

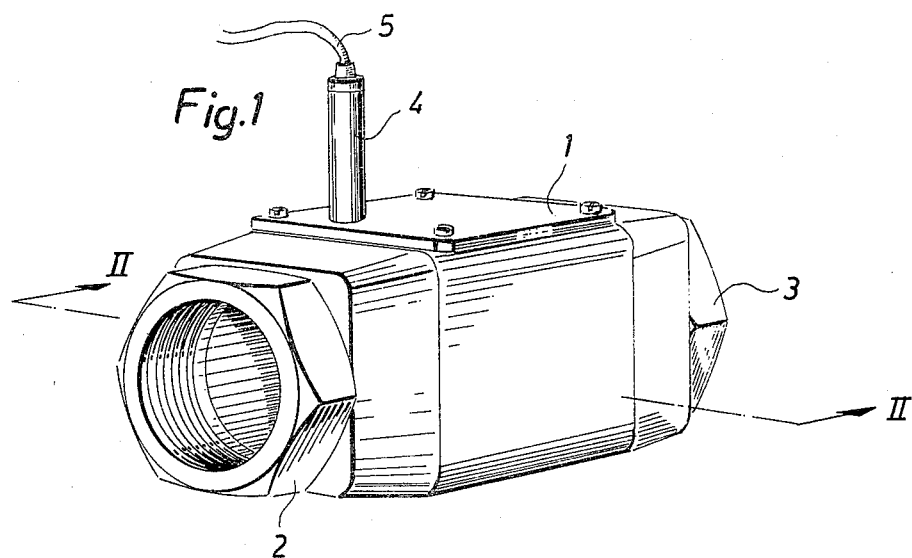
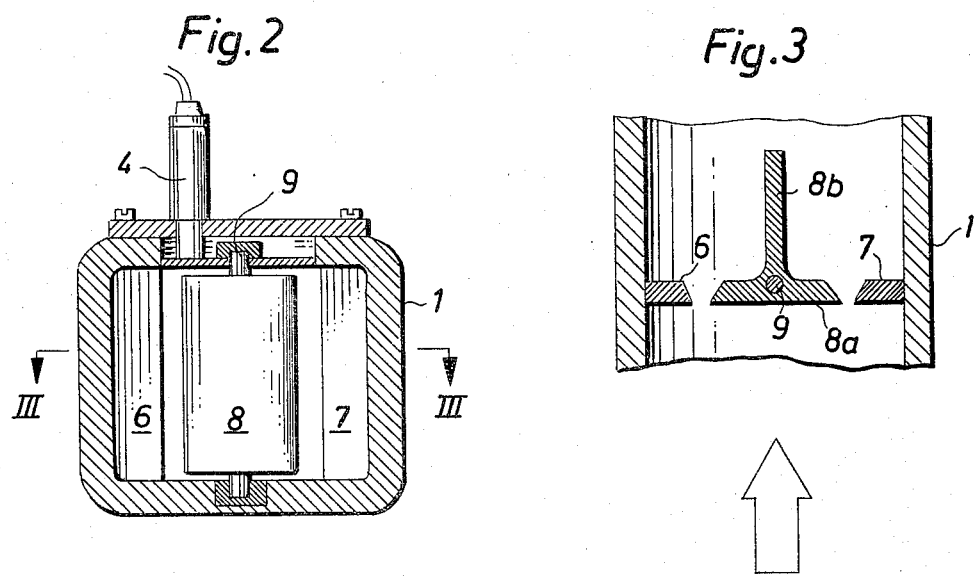
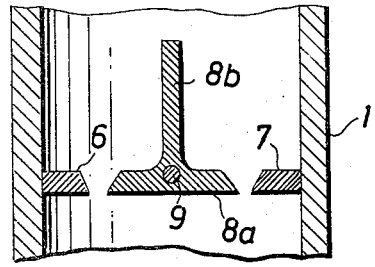

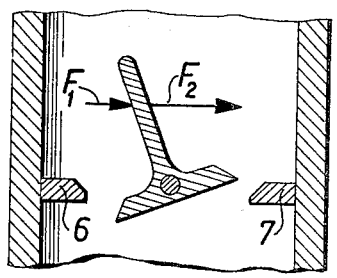
Fig. 4
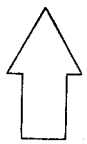
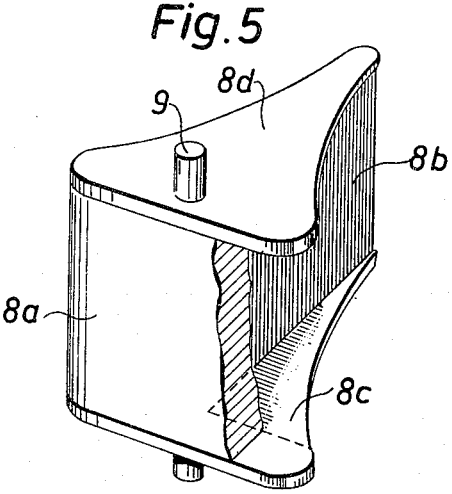
Fig. 5
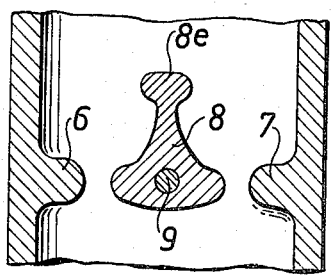
Fig. 6

OSCILLATING VANE FLOWMETER

BACKGROUND OF THE INVENTION

In several technical fields there is a need for a simple and inexpensive flowmeter that is nevertheless accurate and reliable. A typical example of the fields in which a need exists for such a flowmeter is in apartment houses or a district of single-family houses, where demands for economies and a fair allocation of fuel costs between the different consumers have arisen as a result of sharp increases in the prices of fuel oil and other fuels during recent years. The demands just mentioned are not met by the known flowmeters containing a number of rotating parts. On the other hand, the requirements for simplicity are fulfilled by flowmeters that incorporate a vane-like or flap-like element that is set in oscillatory motion by the action of the medium flowing past it, the frequency of this motion being measured and converted to a measure of the flow.

The present invention relates to a flowmeter of the last-mentioned category. However, known flowmeters of this type have a number of serious limitations, the most important of which is that the measuring range, within which the accuracy of measurement has an acceptable magnitude, is rlatively narrow. This applies above all at low rates of flow, e.g. low values of Reynolds Number, a situation that is typical in systems for the distribution of central-heating water. Another disadvantage is that the actuating forces which set the flap-like element of the known flowmeters in oscillatory motion are so small tht use must be made of means that are delicate, and therefore unsuitable in this connection, for converting the frequency of oscillation to a measure of the flow. As an example of such equipment, reference can be made to U.S. Pat. No. 2,453,376, in which an arm connected to the oscillation shaft passes between a source of light and a photoelectric cell. Thus, there exists need for a flowmeter in which the oscillating element is acted upon by such large actuating forces that the transmission of signals can take place in another way, for example by inductive means.

SUMMARY OF THE INVENTION

The object of the present invention is to provide a flowmeter which combines all said advantageous characteristics. Thus, the meter must be of simple design and inexpensive to manufacture, it must have a wide measuring range and a high degree of measuring accuracy within all of this range. This last condition means in other words that the meter shall be able to operate, for example within a flow range, the upper limit of which is approximately 200 times higher than the lower limit, and for values of Reynolds Number between about 200 and $10^6$. All these requirements have been fulfilled in a flowmeter according to the invention, the principal characteristics of which are that a pair of projections located opposite each other are connected to the boundary wall of the fluid flow passage and produce local throttling of the effective area of flow of the passage, so that separation takes place and the flow then becomes turbulent over the entire measuring range of the meter. The oscillating element includes a transverse portion located in or near a plane that is parallel to the axis of oscillation and passes through the projections, and a longitudinal portion located in a plane that contains the axis of oscillation and is parallel to the main direction of fluid flow, so that when the element oscillates between its end positions simultaneous directional changes will occur in the same direction in both branches of the flow passing between the element and each one of the projections, by which means the longitudinal portion of the element is subjected to force components located across the direction of main flow, which will amplify the oscillatory movements of the element.

BRIEF DESCRIPTION OF THE DRAWINGS

Three embodiments of the invention will below be described in detail with reference to the drawing.

FIG. 1 is a perspective view of a flowmeter according to a first embodiment of the invention.

FIG. 2 is a cross-section through the meter, taken along the line II—II in FIG. 1.

FIG. 3 is a section taken along the line III—III in FIG. 2, the oscillating element being in its central position.

FIG. 4 corresponds to FIG. 3, but shows the oscillating element in or adjacent to one of its two end positions.

FIG. 5 is a perspective view showing an oscillating element according to a second embodiment.

FIG. 6 corresponds to FIG. 3 also, but illustrates a third embodiment.

DETAILED DESCRIPTION OF THE PREFERRED EMBODIMENTS

The flowmeter has a housing 1, which at its ends has coupling nuts 2 and 3 for connection into a pipeline throuh which passes the fluid whose flow is to be measured. Housing 1 carries a transmitter 4, connectable through wiring 5 to circuit means (not shown) for converting electrical pulses into a measure of the magnitude of the flow. The converter may be of any known or suitable type and is not described here, as it does not constitute any part of the present invention. However, it should be mentioned that the electrical signal pulses from the transmitter 4 are suitably generated by inductive means, for example in that the transmitter contains a winding, which produces an electromagnetic field inside the meter. When the meter element, described in greater detail below, moves in the magnetic field cyclic changes in intensity will occur in it and these will be sensed by the transmitter. The frequency of these variations will be directly proportional to the frequency of oscillation of the element.

As shown in FIGS. 2–4, a pair of projections 6 and 7 are connected up against two oppositely located parts of the wall limiting the flow passage of the meter. These produce local throttling of the effective flow area of the passage. Close to the projections is the oscillating element 8 of the meter, the oscillation shaft of which is designated by numeral 9. According to the invention, the cross-section of element 8 as seen in a plane at right angles to the oscillation shaft 9, is substantially T-shaped. It includes a part 8a, located in or near a plane parallel to the axis of oscillation and perpendicular to the direction of flow of the medium. Downstream of this part of the element has a part 8b, located in a plane containing the axis of oscillation and parallel to the direction of flow of the medium.

According to the first embodiment of the invention illustrated in FIGS. 3 and 4, prt 8a and the axis of oscillation are in a plane passing through projections 6 and 7. This location of the oscillating element 8 has proved to be advantageous, but is not compulsory. This will be further commented upon below. FIGS. 3 and 4 also show that projections 6 and 7 have their upstream faces located in a plane substantially at right angles to the direction of flow through the meter (marked by an arrow in FIGS. 3 and 4) and that the profile of each of the projections has the shape of a knife edge, the tip of which is at the upstream face.

The operation of the meter described above is as follows. The throttling of the effective flow area of the passage produced by two projections 6 and 7 results in a separation close to them, so that the flow through the meter becomes turbulent in an area which begins slightly upstream of the projections and extends a considerable distance downstream of them. This results in the following two favourable effects.

One of the consequences of the turbulence, produced in both branches of the flow passing element 8, is tht the flow pattern will be constant down to very low values of Reynolds Number, approximately 200. In principle, the total actuating force will be equal to the sum of the two forces marked $F_1$ and $F_2$ in FIG. 4. Force $F_2$ is the transverse component of the force which, as a result of the eductor effect generated in the position of the element shown, will produce a relative negative pressure. This function in itself is already known. On the other hand, what is novel is that the total actuating force will receive a contribution from the force component $F_1$, generated in a corresponding way on the other side of the element, where there is instead a relative positive pressure. Since the total actuating force receives contributions in this way from both negative and positive pressures, a "weathercock effect" will occur, resulting in distinct oscillatory motions and, above all, in that a sufficiently large actuating force becomes available, even at low rates of flow. Stated in other words this means that the meter will have a wide measuring range, the lower limit of which will be at very low values of Reynolds Number. When element 8 passes its central position, as shown in FIG. 3, the effective area of flow will have its minimum value, i.e. the flow speed through both openings on each side of the element 8 will reach its maximum value. As the dynamic pressure is then at maximum, combined with the fact that the oscillating element always reaches its central position with a certain amount of kinetic energy, it is made sure that the turbulent flow pattern will always be maintained. The pressure conditions will be such that the central position will be completely unstable, i.e. there is no risk whatsoever that the oscillating element can stop in this position, not even momentarily.

The other advantageous effect resulting from an arrangement according to the invention does not relate to the width of the measuring range, but to the accuracy of measurement. The turbulent flow pattern gives a rectangular velocity profile within the entire cross-section of flow. It is true tha the area of the rectangle will vary as a function of the rate of flow, but its shape will be maintained substantially constant, which is synonymous with high measuring accuracy. The main reason for this is reduced boundary layers.

In conjunction with the explanation of the reasons for the increase of actuating forces attained by the invention, mention was made of the presence of a relative negative pressure on the one side of the middle part 8b of the oscillating element and a positive pressure on the other side. At low values of flow rate there will be a tendency for this pressure difference to equalize, due to flow round the top and bottom edges of the middle part of the element. It is possible to avoid such pressure equalization by designing the elements so that the top and bottom edges of the middle part are located immediately up against the inner wall of body 1. In cases where it must be expected that the medium flowing through the meter will contain foreign particles, for example grains of sand in water, the presence of narrow slots could involve a risk for such particles to get stuck therein and cause operational disturbances or, in the worst case, block the element completely. It is therefore more suitable in such applications to give the oscillating element the shape shown in FIG. 5. As can be seen, flange-like parts 8c and 8d have been arranged above and below the longitudinal eges of the part 8b, which makes the mentioned overflow impossible in practice.

In the embodiment shown in FIG. 6 projections 6 and 7 have a rounded profile. In addition, the upstream boundary surface of the oscillating element is convex. Finally, part 8b of the element has at its free end a bulb 8e, which increases the positive force on the element.

A flowmeter operating according to the invention can be varied to a wide extent as regards the detail design of its various components. It is suitable, but by no means necessary, that the transverse part 8a of the oscillating element has substantially the same thickness as projections 6 and 7. Also, optimum operating conditions are often obtained when the transverse part of the element in its position of symmetry is substantially in the same plane as the two projections. However, since the general condition is that the oscillating element shall be within the area where the projections cause turbulent flow, it is realized that the oscillation axis of the element can be slightly upstream or downstream of the projections. Correspondingly, the length of the longitudinal part 8b in the direction of flow does not need to coincide with that of the turbulent area, but can be either shorter or longer. The inventive idea is utilized as soon as there is, with the aid of projections or equivalent means, produced a throttling that causes a turbulent flow zone within which there is arranged an oscillating element, the total actuating force of which is formed by the combined action of positive and negative pressures on both sides of the element.

A flowmeter according to the invention is of value in all connections where high measuring accuracy is required over a wide measuring range and, particularly, when the lower limit of this range corresponds to low values of Reynolds Number. Flow measurement in the food processing industry can be mentioned as a further example of a field of application. Here it is particularly advantageous that the simple design of the meter makes it easy to keep it clean.

I claim:

1. A flowmeter comprising a vane-like element (8) disposed in a fluid passage and arranged to oscillate about an axis (9) perpendicular to the direction of flow of the fluid, and means for converting the frequency of oscillation of the element into information about the magnitude of the flow, characterized by: a pair of fixed projections (6, 7) located substantially opposite each other and extending inwardly and generally towards each other from an interior wall of the passage for producing local throttling of the effective flow area of the passage and attendant separation and turbulent flow downstream thereof over the entire measurement range of the meter, and said oscillating element including a first laterally extending portion (8a) located, when in a neutral position, in or closely proximate a plane parallel to the axis of oscillation, said plane passing through innermost ends of the projections, to establish two fluid flow branches between opposite ends of said first portion and the pair of projections, respectively, and a second elongate portion (8b) located in a plane containing the axis of oscillation and parallel to the main direction of fluid flow, the second portion being fixed to and substantially perpendicular to the first portion and extending downstream therefrom, whereby reinforcing forces having transverse components acting on the second portion and tending to rotate the oscillating element in the same direction are separately and simultaneously generated by fluid flowing through both branches, to thereby amplify the oscillatory movements of the element and widen its accurate measurement range.

2. A flowmeter according to claim 1, characterized in that each of the projections (6, 7) has its upstream side face located in a plane substantially at right angles to the main direction of flow.

3. A flowmeter according to claim 1 or 2, characterized in that the profile of each of the projections (6, 7) has the shape of a knife edge, the tip of which is close to its upstream face.

4. A flowmeter according to claim 1, characterized in that the projections (6, 7) and said first portion (8a) of the element have substantially the same thickness as measured in the direction of flow.

5. A flowmeter according to claim 1, wherein the projections and said first portion of the element are substantially coplanar.

6. A flowmeter according to claim 1, wherein the axis of oscillation is disposed substantially midway between the ends of said first portion of the element.

7. A flowmeter according to claim 5, wherein the axis of oscillation is disposed substantially midway between the ends of said first portion of the element.

8. A flowmeter according to claim 1, wherein said first portion of the element and the axis of oscillation are substantially disposed in the plane passing through the innermost ends of the projections.

9. A flowmeter, characterized by:
(a) a pair of fixed projections (6, 7) located substantially opposite each other and extending inwardly and generally towards each other from an interior wall of a fluid flow passage for producing local throttling of the effective flow area of the passage and attendant separation and turbulent flow downstream thereof, and
(b) a vane member (8) mounted within the passage for oscillation about an axis lying substantially within a plane passing through the projections,
(c) the vane member being generally T-shaped and including a first laterally extending portion (8a) lying substantially within said plane when the vane member is in a neutral position, and a second elongate portion (8b) intersecting the first portion and extending downstream therefrom,
(d) the axis being substantially disposed at the intersection of the first and second vane member portions, and
(e) opposite ends of the first vane member portion defining two fluid flow branches with the respective projections,
(f) whereby reinforcing forces having transverse components acting on the second portion and tending to rotate the vane member in the same direction are separately and simultaneously generated by oscillating directional changes of the fluid flowing through both branches, to thereby amplify the oscillatory movements of the vane member and widen its accurate measurement range.

* * * * *